United States Patent
Shimandle

[11] Patent Number: 5,617,668
[45] Date of Patent: Apr. 8, 1997

[54] BAIT HOLDER APPARATUS

[76] Inventor: Donald J. Shimandle, 1096 Navajo Trail, Streetsboro, Ohio 44241

[21] Appl. No.: 491,546

[22] Filed: Jun. 16, 1995

[51] Int. Cl.$^6$ ................................................. A01K 83/06
[52] U.S. Cl. .............................................. 43/44.8; 43/44.2
[58] Field of Search .................................. 43/44.8, 44.2; 24/306, 442

[56] References Cited

U.S. PATENT DOCUMENTS

| | | | |
|---|---|---|---|
| 3,105,319 | 10/1963 | Whalen | 43/44.8 |
| 3,841,648 | 10/1974 | Meyer | 24/306 |
| 3,940,873 | 3/1976 | Lawless | 24/442 |
| 4,229,901 | 10/1980 | Flowers et al. | 43/44.8 |
| 4,471,558 | 9/1984 | Garcia | 43/44.8 |
| 4,625,451 | 12/1986 | Griffiths | 43/44.8 |
| 4,646,464 | 3/1987 | Wyatt | 43/44.8 |
| 4,691,467 | 9/1987 | Brimmer | 43/44.8 |
| 5,002,212 | 3/1991 | Charleton | 24/442 |
| 5,117,575 | 6/1992 | Desmond . | |
| 5,214,874 | 6/1993 | Faulkner | 24/306 |
| 5,216,829 | 6/1993 | Morton . | |
| 5,276,989 | 1/1994 | Lumb et al. . | |
| 5,301,452 | 4/1994 | Roach . | |
| 5,333,407 | 8/1994 | Merritt | 43/44.8 |
| 5,339,559 | 8/1994 | Strobbe . | |

Primary Examiner—Joseph J. Hail, III
Assistant Examiner—Darren Ark

[57] ABSTRACT

A hookless bait holder apparatus includes a flexible substrate which has a first end, a second end, a first side, and a second side. A loop is connected to the flexible substrate adjacent to the first end of the flexible substrate. A quantity of first hook-or-loop material is connected to the first side of the flexible substrate adjacent to the first end of the flexible substrate, and a quantity of second hook-or-loop material is connected to the second side of the flexible substrate adjacent to the second end of the flexible substrate. The second hook-or-loop material is complementary to the first hook-or-loop material. The first hook-or-loop material is in a form of a first patch of first hook-or-loop material attached to the flexible substrate. The second hook-or-loop material is in a form of a second patch of second hook-or-loop material attached to the flexible substrate. The loop is formed from a portion of the flexible substrate. The flexible substrate may be made from a stretchable material. A specimen of live bait is encompassed by the flexible substrate and is secured to the flexible substrate by connecting the first hook-or-loop material to the second hook-or-loop material.

6 Claims, 3 Drawing Sheets

BAIT HOLDER APPARATUS

BACKGROUND OF THE INVENTION

1. Field of the Invention

The present invention relates generally to devices for holding bait for fishing and, more particularly, to devices especially adapted for positioning bait near a fishing hook.

2. Description of the Prior Art

Fishermen have an option between using non-living bait and live bait when fishing. Live bait may have certain advantages, but there are also certain disadvantages associated with the use of live bait. For example, most often, when live bait, such as worms, minnows, and grasshoppers, is employed, the live bait is skewered by a fishing hook. Pushing a fishing hook through a live creature may impact great trauma on the creature and may in fact kill the bait so that it is no longer alive. Even if the live bait is not killed by a fishing hook, it can be sufficiently injured so that it is not active on the hook and may not readily attract a fish. Moreover, in the process of placing live bait on a hook, it is a common result that the bait shifts or wiggles, and the fishing hook accidentally cuts into the fisherman's skin causing pain, injury, and the risk of infection. Moreover, there are some fishermen who are squeamish about pushing a fishing hook through a living creature. For the numerous reasons set forth above, it would be desirable if a device were provided that retains live bait near a fishing hook without requiring the fishing hook to penetrate into the live bait.

In the prior, U.S. Pat. No. 5,117,575 discloses a bait positioning and attachment device which positions live bait near a fishing hook without requiring the fishing hook to penetrate the live bait. However, with the device in this patent, a flexible strip must penetrate the live bait in order to secure the live bait near the hook. As stated above, penetration into live bait may kill or disable the live bait. Therefore, it would be desirable if a device were provided which permitted live bait to be positioned near a fishing hook without requiring that the live bait be penetrated by any device.

The following patents may be of interest for their disclosure of devices for securing bait to a fishing hook by penetrating the bait with the fishing hook: U.S. Pat. Nos. 5,216,829; 5,301,452; and 5,339,559. In addition, U.S. Pat. No. 5,276,989 may be of interest for its disclosure of a fish handling net.

Still other features would be desirable in a live bait holding and positioning device. Different types of live bait come in different sizes and different shapes. In this respect, it would be desirable if a live bait holding and positioning device were provided which is adjustable to live bait of different sizes and different shapes.

The environment in which a live bait holding and positioning device is employed is generally a wet environment. In this respect, it would be desirable for a live bait holding and positioning device to be easily operated in a wet environment. When a live bait holding and positioning device is placed near a fishing hook, it is important that it not get in the way of the hook; that is, when a fish strikes at the live bait, the fishing hook should be in a direct line of the strike so that the fish is hooked when attempting to get at the live bait.

To avoid complexity of manufacturing and use, it would be desirable if a live bait holding and positioning device were made of one-piece construction. Since the live bait holding and positioning device is exposed to aqueous environments, it would be desirable for the live bait holding and positioning device to be made from materials that are not corroded in an aqueous environment.

The live bait holding and positioning device is an adjunct to a conventional fishing hook and fishing line. As such, the live bait holding and positioning device should be readily attachable to a conventional fishing line for positioning adjacent to a conventional fishing hook.

Thus, while the foregoing body of prior art indicates it to be well known to use a live bait holding and positioning device, the prior art described above does not teach or suggest a live bait holding and positioning device which has the following combination of desirable features: (1) retains live bait near a fishing hook without requiring the fishing hook to penetrate into the live bait; (2) permits live bait to be positioned near a fishing hook without requiring the live bait to be penetrated by any device; (3) is adjustable to live bait of different sizes and different shapes; (4) is easily operated in a wet environment; (5) is located in a direct line of strike with a fishing hook when a fish strikes so that the fish is hooked when attempting to get at the live bait; (6) is made of one-piece construction; (7) is made from materials that are not corroded in an aqueous environment; and (8) is readily attachable to a conventional fishing line for positioning adjacent to a conventional fishing hook. The foregoing desired characteristics are provided by the unique hookless bait holder apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a hookless bait holder apparatus which includes a flexible substrate which has a first end, a second end, a first side, and a second side. A loop is connected to the flexible substrate adjacent to the first end of the flexible substrate. A quantity of first hook-or-loop material is connected to the first side of the flexible substrate adjacent to the first end of the flexible substrate, and a quantity of second hook-or-loop material is connected to the second side of the flexible substrate adjacent to the second end of the flexible substrate. The second hook-or-loop material is complementary to the first hook-or-loop material. The first hook-or-loop material is in a form of a first patch of first hook-or-loop material attached to the flexible substrate. The second hook-or-loop material is in a form of a second patch of second hook-or-loop material attached to the flexible substrate. The loop is formed from a portion of the flexible substrate. The flexible substrate may be made from a stretchable material. A specimen of live bait is encompassed by the flexible substrate and is secured to the flexible substrate by connecting the first hook-or-loop material to the second hook-or-loop material.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hookless bait holder apparatus which has all of the advantages of the prior art and none of the disadvantages.

It is another object of the present invention to provide a new and improved hookless bait holder apparatus which may be easily and efficiently manufactured and marketed.

It is a further object of the present invention to provide a new and improved hookless bait holder apparatus which is of durable and reliable construction.

An even further object of the present invention is to provide a new and improved hookless bait holder apparatus which is susceptible of a low cost of manufacture with regard to both materials and labor, and which accordingly is then susceptible of low prices of sale to the consuming public, thereby making such hookless bait holder apparatus available to the buying public.

Still yet a further object of the present invention is to provide a new and improved hookless bait holder apparatus which retains live bait near a fishing hook without requiring the fishing hook to penetrate into the live bait.

Still another object of the present invention is to provide a new and improved hookless bait holder apparatus that permits live bait to be positioned near a fishing hook without requiring the live bait to be penetrated by any device.

Yet another object of the present invention is to provide a new and improved hookless bait holder apparatus which is adjustable to live bait of different sizes and different shapes.

Even another object of the present invention is to provide a new and improved hookless bait holder apparatus that is easily operated in a wet environment.

Still a further object of the present invention is to provide a new and improved hookless bait holder apparatus which is located in a direct line of strike with a fishing hook when a fish strikes so that the fish is hooked when attempting to get at the live bait.

Yet another object of the present invention is to provide a new and improved hookless bait holder apparatus that is made of one-piece construction.

Still another object of the present invention is to provide a new and improved hookless bait holder apparatus which is made from materials that are not corroded in an aqueous environment.

Yet another object of the present invention is to provide a new and improved hookless bait holder apparatus that is readily attachable to a conventional fishing line for positioning adjacent to a conventional fishing hook.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
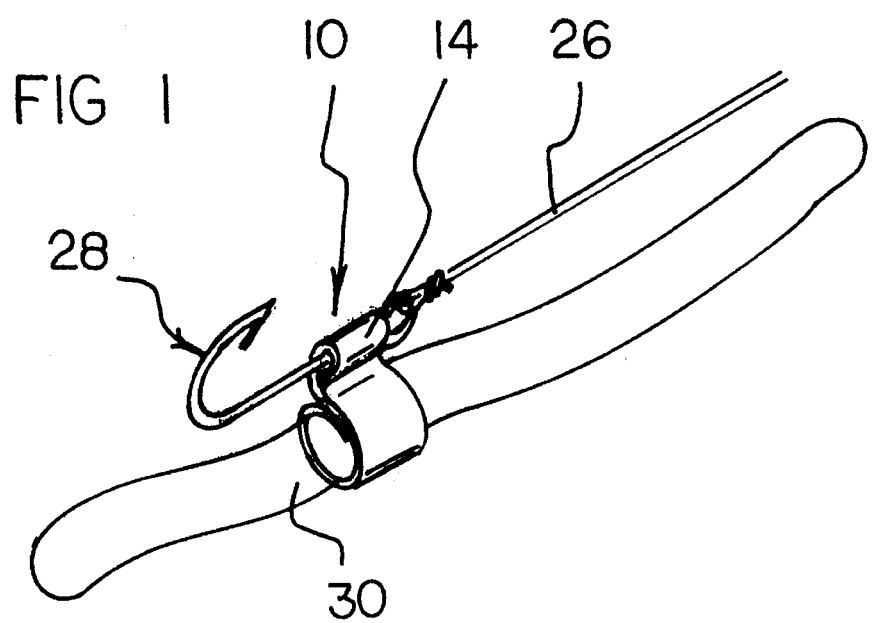
FIG. 1 is a perspective view showing a preferred embodiment of the hookless bait holder apparatus of the invention in a closed position holding a live worm and attached to a fishing hook.
Figure 2:
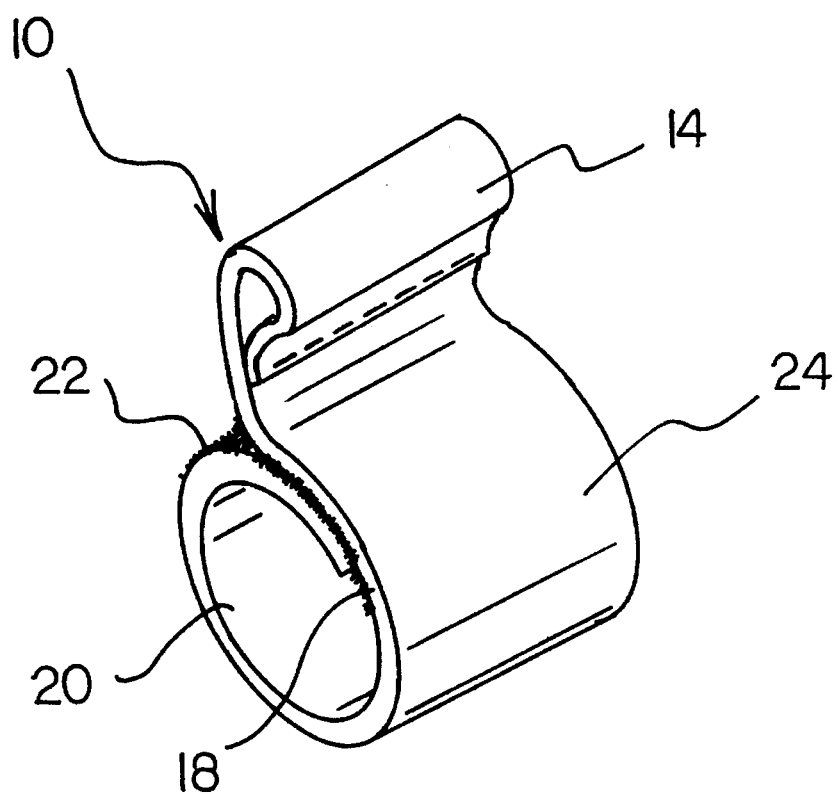
FIG. 2 is an enlarged perspective view of the embodiment of the hookless bait holder apparatus shown in FIG. 1 in a closed position without containing bait and not connected to a fishing hook.
Figure 3:
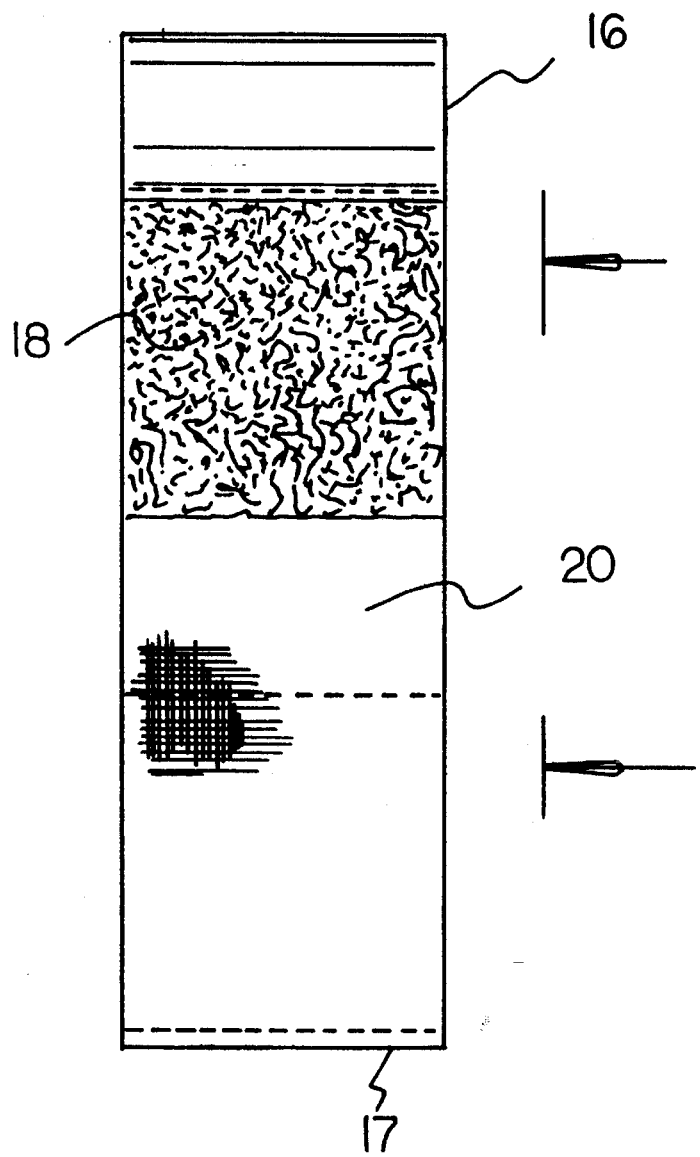
FIG. 3 is a front view of the embodiment of the invention shown in FIG. 2 in an open position.
Figure 4:
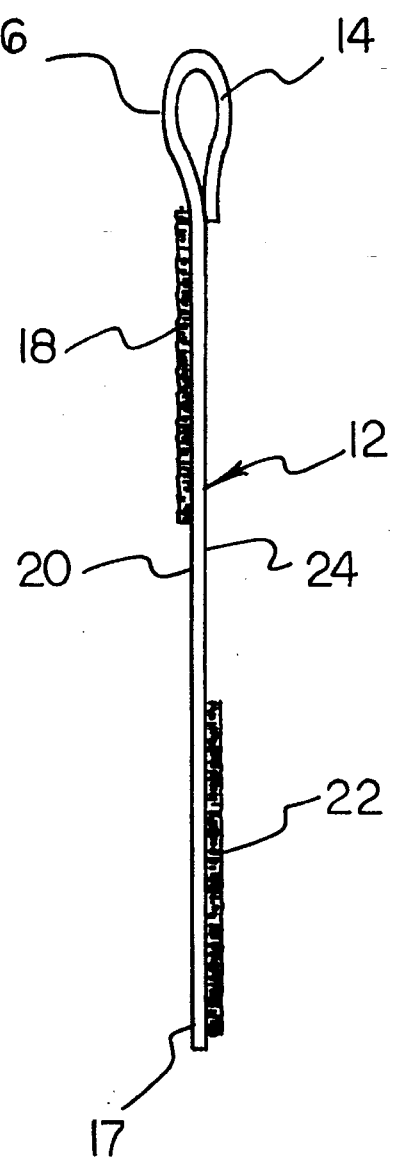
FIG. 4 is a side view of the embodiment of the invention shown in FIG. 3.
Figure 5:
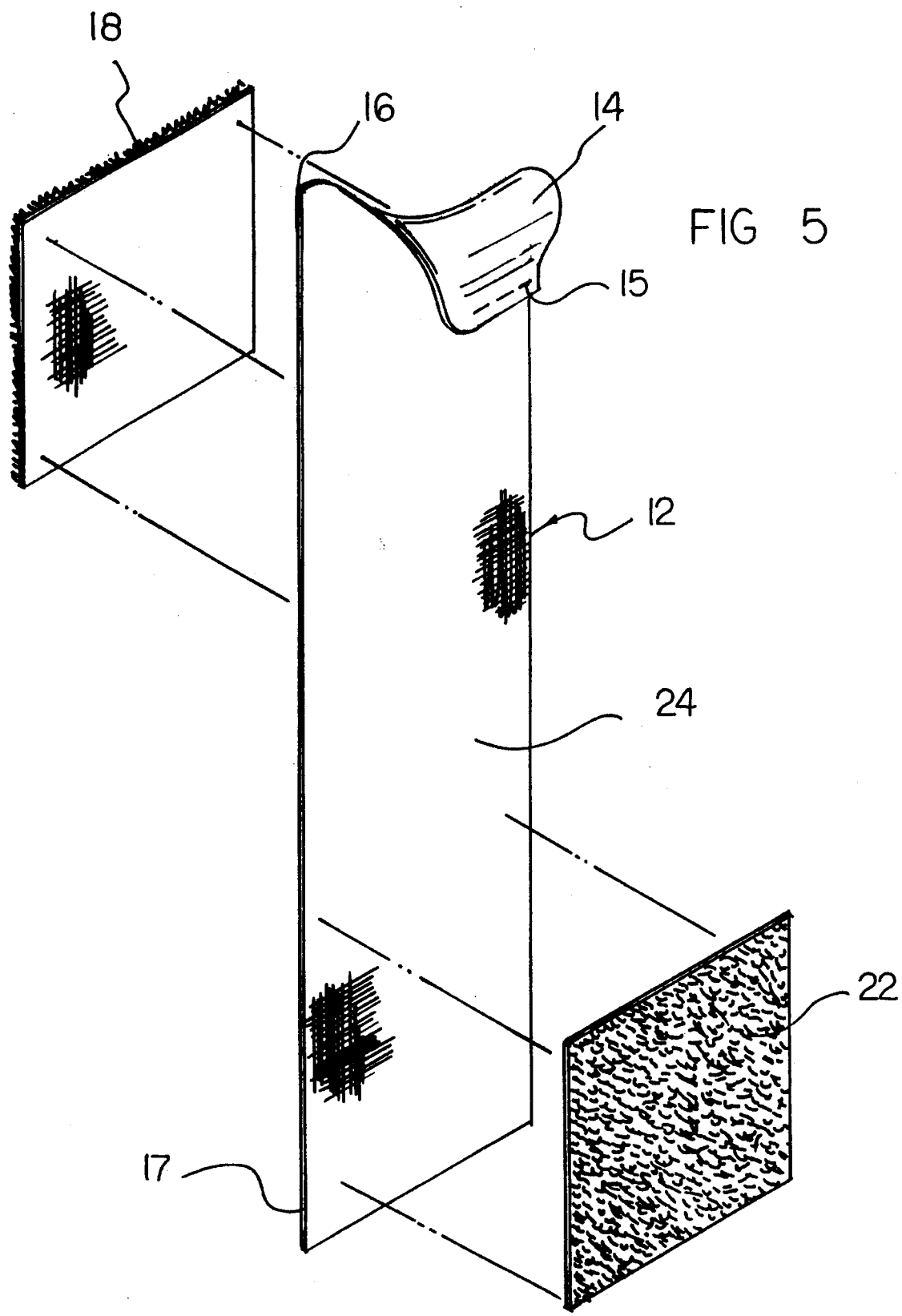
FIG. 5 is an exploded view of the embodiment of the invention shown in FIG. 4.

With reference to the drawings, a new and improved hookless bait holder apparatus embodying the principles and concepts of the present invention will be described.

Turning to FIGS. 1–5, there is shown an exemplary embodiment of the hookless bait holder apparatus of the invention generally designated by reference numeral 10. In its preferred form, hookless bait holder apparatus 10 includes a flexible substrate 12 which has a first end 16, a second end 17, a first side 20, and a second side 24. A loop 14 is connected to the flexible substrate 12 adjacent to the first end 16 of the flexible substrate 12. A quantity of first hook-or-loop material 18 is connected to the first side 20 of the flexible substrate 12 adjacent to the first end 16 of the flexible substrate 12, and a quantity of second hook-or-loop material 22 is connected to the second side 24 of the flexible substrate 12 adjacent to the second end 17 of the flexible substrate 12. The second hook-or-loop material 22 is complementary to the first hook-or-loop material 18. The first hook-or-loop material 18 and the second hook-or-loop material 22 can be made from the well-known VEL-CRO(TM) material. The first hook-or-loop material 18 is in a form of a first patch of first hook-or-loop material 18 attached to the flexible substrate 12. The second hook-or-loop material 22 is in a form of a second patch of second hook-or-loop material 22 attached to the flexible substrate 12.

The first patch and the second patch of hook-or-loop material are attached to the flexible substrate 12 using an adhesive material. The patches can also be sewn to the flexible substrate 12.

The loop 14 is formed from a portion of the flexible substrate 12. In forming the loop 14, a portion of the first end 16 of the flexible substrate 12 is turned back over itself, and a free end portion is sewn with stitches 15 to a portion of the remainder of the flexible substrate 12 to form the loop 14. The flexible substrate 12 may be made from a stretchable material.

In using the hookless bait holder apparatus 10 the invention, a free end of fishing line 26 is passed through the loop 14. With the free end of the fishing line 26 extending through the loop 14, a conventional fishing hook 28 is connected to the free end of the fishing line 26. In this way, the hookless bait holder apparatus 10 of the invention is retained by the fishing line 26. As shown in FIG. 1, the loop 14 has been moved down the fishing line 26 and onto the straight portion of the fishing hook 28. After the loop 14 has been attached to either the fishing line 26 or the fishing hook 28, a specimen of live bait, shown as worm 30 is attached to the hookless bait holder apparatus 10. To do so, the worm 30 is placed against the first side 20 of the flexible substrate 12 below the first hook-or-loop material 18. Then, the second end 17 of the flexible substrate 12 is pulled around the worm 30 so that the worm 30 is encompassed by the flexible substrate 12. When the worm 30 is encompassed by the flexible substrate 12, the second hook-or-loop material 22 is placed into engagement with the first hook-or-loop material 18 for securing the worm 30 to the hookless bait holder apparatus 10. The relative sizes of the first hook-or-loop material 18 and the second hook-or-loop material 22 permit a wide variety of live baits to be encompassed by and secured to the flexible substrate 12.

Clearly, in using the hookless bait holder apparatus 10 of the invention, the worm 30 is not penetrated as it is secured to the flexible substrate 12. Moreover, with the loop 14 secured to either the fishing line 26 or the straight portion of the fishing hook 28, the live bait is placed behind the fishing hook 28. As a result, when a fish strikes at the live bait, the fishing hook 28 is in front of and in alignment with the live bait.

Other advantages are obtained by using the hookless bait holder apparatus 10 of the invention. The hookless bait holder apparatus 10 can be used with a fly rod. Bait is not lost while casting due to hook damage.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved hookless bait holder apparatus that is low in cost, relatively simple in design and operation, and which may advantageously be used to retain live bait near a fishing hook without requiring the fishing hook to penetrate into the live bait. With the invention, a hookless bait holder apparatus is provided which permits live bait to be positioned near a fishing hook without requiring the live bait to be penetrated by any device. With the invention, a hookless bait holder apparatus is provided which is adjustable to live bait of different sizes and different shapes. With the invention, a hookless bait holder apparatus is provided which is easily operated in a wet environment. With the invention, a hookless bait holder apparatus is provided which is located in a direct line of strike when a fish strikes so that the fish is hooked when attempting to get at the live bait. With the invention, a hookless bait holder apparatus is provided which is made of one-piece construction. With the invention, a hookless bait holder apparatus is provided which is made from materials that are not corroded in an aqueous environment. With the invention, a hookless bait holder apparatus is provided which is readily attachable to a conventional fishing line for positioning adjacent to a conventional fishing hook.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A bait holder apparatus, comprising in combination:

a fishing hook which includes a first end, a second end having at least one hook portion with a barb and a sharp pointed end, and a straight shank portion which is disposed between said first end and said second end, wherein the at least one hook portion is connected to said straight portion;

a flexible substrate having a first end, a second end, a first side, and a second side, a loop, said loop being attached to said straight shank portion of said fishing hook, wherein said loop is formed from a free end portion of said first end of said flexible substrate, a quantity of first hook-or-loop material connected to said first side of said flexible substrate adjacent to said first end of said flexible substrate, and a quantity of second hook-or-loop material connected to said second side of said flexible substrate adjacent to said second end of said flexible substrate, wherein said second hook-or-loop material is complementary to said first hook-or-loop material, wherein, when said first hook-or-loop material and said second hook-or-loop material are connected together, said flexible substrate is formed into a bait-encompassing loop.

2. The apparatus of claim 1 wherein said first hook-or-loop material is in a form of a first patch of first hook-or-loop material attached to said flexible substrate.

3. The apparatus of claim 1 wherein said second hook-or-loop material is in a form of a second patch of second hook-or-loop material attached to said flexible substrate.

4. The apparatus of claim 1 wherein said loop is formed from a portion of said flexible substrate.

5. The apparatus of claim 1 wherein said flexible substrate is made from a stretchable material.

6. A method for attaching bait to a fishing hook which includes a first end, a second end having at least one hook portion with a barb and a sharp pointed end, and a straight shank portion which is disposed between said first end and said second end, wherein the at least one hook portion is connected to said straight portion, comprising the steps of:

obtaining a quantity of flexible material that has a first end, a second end, a loop at the first end, a quantity of first hook-or-loop material at the first end, and a quantity of second hook-or-loop material at the second end, wherein the first hook-or-loop material and the second hook-or-loop material are complementary, installing the loop at the first end of the flexible material around said straight shank portion of said fishing hook, placing bait on the flexible material between the first end and the second end, wrapping the flexible material around the bait, and securing the first end of the flexible material to the second end of the flexible material by engaging the first hook-or-loop material with the second hook-or-loop material, whereby the bait is retained by the flexible material.

* * * * *